United States Patent
Schrader et al.

(10) Patent No.: US 6,568,319 B2
(45) Date of Patent: May 27, 2003

(54) JUICE EXTRACTOR WITH IMPROVED TWO-PIECE ORIFICE TUBE

(75) Inventors: Gregory W. Schrader, Lakeland, FL (US); David S. Jackson, Brandon, FL (US); Mark Jackson, Auburndale, FL (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/854,849

(22) Filed: May 14, 2001

(65) Prior Publication Data

US 2002/0166465 A1 Nov. 14, 2002

(51) Int. Cl.[7] ............... B30B 9/02; A23N 1/02
(52) U.S. Cl. ............ 100/108; 99/510; 100/98 R; 100/213; 100/37; 403/109.1; 285/145.1
(58) Field of Search .................. 100/37, 98 R, 100/108, 213; 99/509, 510, 496, 495; 403/109.1; 285/145.1, 390

(56) References Cited

U.S. PATENT DOCUMENTS

| | | | | |
|---|---|---|---|---|
| 2,649,730 A | | 8/1953 | Hait .................. | 100/37 |
| 2,856,846 A | | 10/1958 | Belk ................. | 100/108 |
| 3,236,175 A | | 2/1966 | Belk ................. | 100/108 |
| 3,736,865 A | * | 6/1973 | Hait ................. | 100/98 R |
| 4,376,409 A | * | 3/1983 | Belk ................. | 99/509 |
| 4,700,620 A | * | 10/1987 | Cross ................ | 99/510 |
| 4,922,813 A | * | 5/1990 | Compri .............. | 100/108 X |
| 5,170,700 A | | 12/1992 | Anderson et al. ..... | 99/510 |
| 5,970,861 A | | 10/1999 | Suter et al. ........ | 100/37 |
| 5,992,311 A | | 11/1999 | Suter et al. ........ | 100/37 |
| 5,996,485 A | | 12/1999 | Suter et al. ........ | 100/37 |

* cited by examiner

Primary Examiner—W. Donald Bray
(74) Attorney, Agent, or Firm—Allen, Dyer, Doppelt, Milbrath & Gilchrist, P.A.

(57) ABSTRACT

A juice extractor includes a strainer tube mounted to receive juice and pulp of fruit. An orifice tube is moveable within the strainer tube and includes a first tube portion and opposing second tube portion threaded within the first tube portion. A drive mechanism engages the orifice tube for reciprocating the orifice tube within the strainer tube and separating juice and pulp within the strainer tube.

26 Claims, 4 Drawing Sheets

JUICE EXTRACTOR WITH IMPROVED TWO-PIECE ORIFICE TUBE

FIELD OF THE INVENTION

This invention relates to the field of juice extractors, and more particularly, this invention relates to a juice extractor having an orifice tube moveable within a strainer tube.

BACKGROUND OF THE INVENTION

A well known juice extractor design is disclosed in U.S. Pat. No. 2,649,730 to Hait, and assigned to the present assignee, the disclosure which is hereby incorporated by reference in its entirety. In this type of vertically arranged juice extractor, upper and lower cups support a fruit, vegetable or similar product. The sides of both upper and lower cups have fingers that intermesh and interdigitate together. The upper cup descends into the lower cup against the fruit or vegetable and is pressed against a circular, lower cutter positioned at the top of a strainer tube adjacent the lower cup and an upper cutter positioned in the upper cup. Plugs are cut into the top and bottom portions of the fruit or vegetable as the interdigitating fingers of the two cups mesh together. Inner portions of the fruit, such as the pulp and juice, are forced down into the strainer tube positioned within a manifold. An orifice tube moves upward in the strainer tube and applies pressure into the internal portion of the strainer tube to separate juice and pulp within the strainer tube.

In some orifice tubes, "windows" are formed in the orifice tube end that engages the fruit or vegetable for enhancing juice recovery from any pulp. Although this "window tube" type orifice tube provides enhanced juice recovery, the open areas formed by the "windows" weaken that end of the orifice tube. Therefore, in one proposed design, a two-piece orifice tube was used where a first tube portion corresponding to the lower orifice tube section received a shorter length, opposing second tube portion, which engaged the fruit or vegetable. This shorter piece was formed from a strong material, such as an alloy tool steel. The two pieces were press fit together to ensure concentricity. Because there was not a strong interface between the parts, the parts would occasionally separate in the field, causing machine damage. The press fit was considered essential because the two pieces of the orifice tube had to be concentric. This was essential because the orifice tube moved within the strainer tube and had to have a clear, concentric clearance to separate juice and pulp within the strainer tube.

SUMMARY OF THE INVENTION

It is therefore an object of the present invention to provide a two-piece orifice tube where the tube portion that engages a fruit or vegetable maintains concentricity and engagement with the tube portion forming the orifice tube while maintaining a strong interface between the two pieces.

It is yet another object of the present invention to provide a two-piece orifice tube where the tube portion that engages a fruit or vegetable can be disengaged for replacement from an opposing tube portion.

The present invention is advantageous and provides a juice extractor with a strainer tube mounted to receive juice and pulp of fruit and an orifice tube moveable within the strainer tube. The orifice tube includes a first tube portion and an opposing second tube portion threaded within the first tube portion. A drive mechanism engages the orifice tube and reciprocates the orifice tube within the strainer tube for separating juice and pulp within the strainer tube. The second tube portion has open window areas for enhancing juice recovery from pulp. A close tolerance shank is formed on the second tube portion and received within the first tube portion to guide the second tube portion therein. This second tube portion is formed primarily from hardened tool steel, while the first tube portion is formed primarily from stainless steel.

In yet another aspect of the present invention, the first tube portion includes an internal stop. The second tube portion includes an external stop formed at an end thereof for engaging the internal stop of the first tube portion. This external stop is formed as a shank and is received with a close tolerance fit into the internal stop.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and now allows the use of a two-piece orifice tube that is moveable within a strainer tube as part of a juice extractor where the strainer tube is mounted to receive juice and pulp of fruit. The orifice tube includes a first tube portion and opposing second tube portion threaded within the first tube portion. In one non-limiting example, the second tube portion has open window areas for enhancing juice recovery from pulp and maintaining concentricity. This second tube portion in one aspect includes a close tolerance shank that is received within the first tube portion for guiding the second tube portion therein. Threads retain the second tube portion within the first tube portion. Not only do the two pieces remain secured, but concentricity is maintained.

Figure 1:
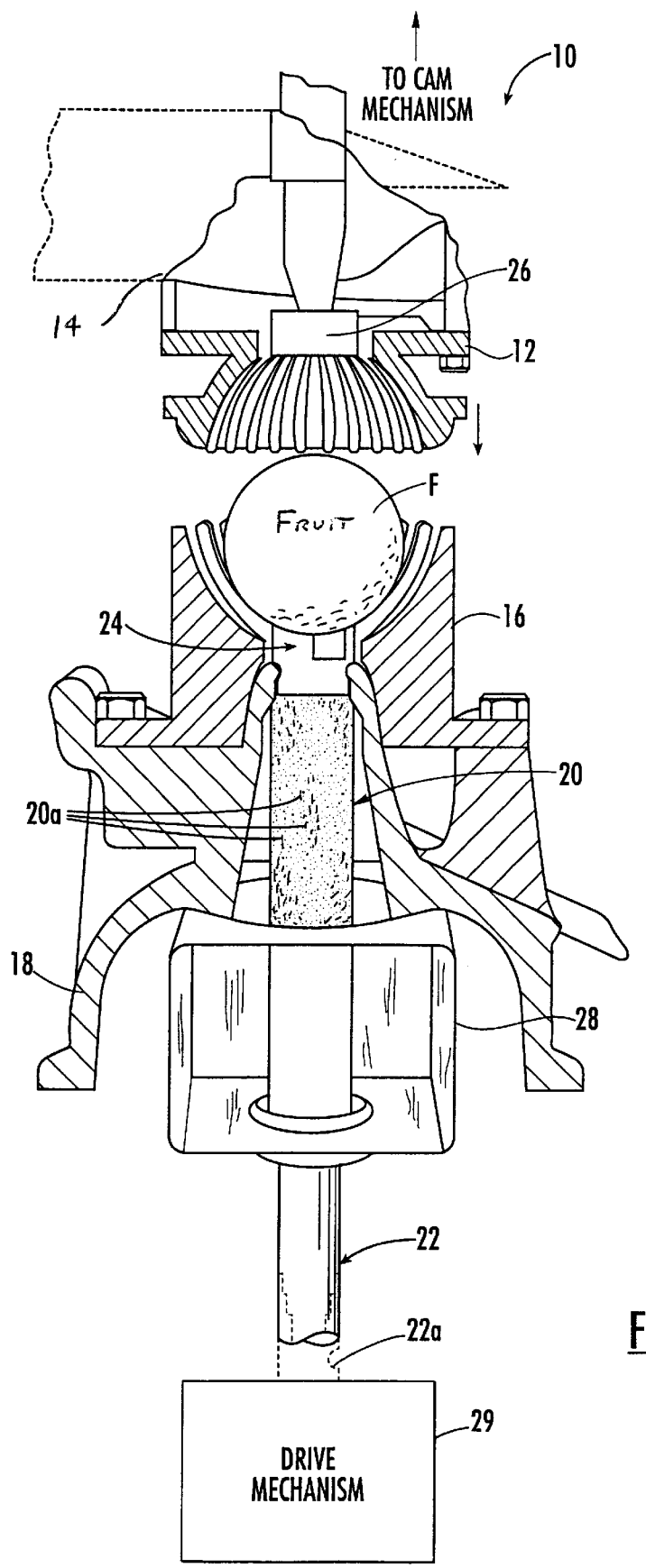
FIG. 1 is a partial isometric and sectional elevation view of a portion of a juice extractor showing upper and lower cups, strainer tube and orifice tube.

For purposes of description, an elevation and partial isometric and sectional view of a juice extractor that can be used with the present invention is shown in FIG. 1. Although a vertical juice extractor is illustrated, it should be understood that different types of juice extractors can be used with the present invention, including those having horizontally moving cups and other similar mechanisms.

The basic juice extractor is illustrated at 10 and includes an upper cup 12 mounted on a common crossbar 14, which could interconnect other cups of other juice extractor units (not shown), as known to those skilled in the art. Naturally, the juice extractor 10 could be used as a single juice extractor unit or a ganged with a plurality of juice extractors. The crossbar 14 moves in a fixed up and down direction by a cam mechanism (not shown) mounted in the top portion of the juice extractor. The lower cup 16 is rigidly positioned to a frame 18. The upper and lower cups 12,16 are formed as interdigitated cups having fingers that intermesh together when the upper cup 12 is moved into the lower cup 16.

The upper and lower cups 12,16, the prefinisher strainer tube 20, the orifice tube 22 and associated components form one juice extractor unit. The cam mechanism drives the upper cup into the lower cup, and as this occurs, any fruit or vegetable is pressed against a circular lower cutter 24 formed as a tube and located at the top of the strainer tube 20. This cutter 24 cuts a plug in the bottom of the fruit to allow internal portions of the fruit access to the strainer tube 20. A circular upper cutter 26 cuts a plug in the top of the fruit to permit separation of peel from internal portions of the fruit, such as the pulp.

As the fingers of the upper and lower cups 12,16 interdigitate or mesh together, the inner portions of the fruit, such as any pulpy juice, is forced down into the strainer tube 20 contained within a juice manifold 28. In the early phase of the extraction cycle, the upper cup moves downward to cause pressure on the fruit such that top and bottom plugs are cut. Because of the profile of the interdigitating cups, the fruit or other supported body, such as a vegetable, is totally supported, and will not burst, but obtain an even squeeze.

As the extraction cycle continues, pressure increases on the fruit, causing some internal portions to form a bottom plug and move into the strainer tube 20. In one aspect, when there is a peel clearance, the peel is discharged between the upper cup 12 and cutter 26. Upon completion of the extraction cycle, internal portions of the fruit are positioned in the strainer tube 20. At this time, the orifice tube 22 moves upward, placing pressure on the contents of the strainer tube. The juice and juice sacks, because of their small particle size, flow through the holes 20a of the strainer tube and into the juice manifold. Those internal portions of the fruit having particle sizes larger than the holes in the strainer tube are forced through a discharge opening 22a in the orifice tube and are discharged.

The peel surfaces do not contact the juice and any contamination by the extractives in the peel are minimized. The peel falls away outside the juice manifold 28 and can be collected by a peel screw conveyor under an extractor platform or other means (not shown) and discharged into a hopper or other waste disposal container and conveyed by truck or trailer to a desired destination for further processing, if desired.

Figure 2:
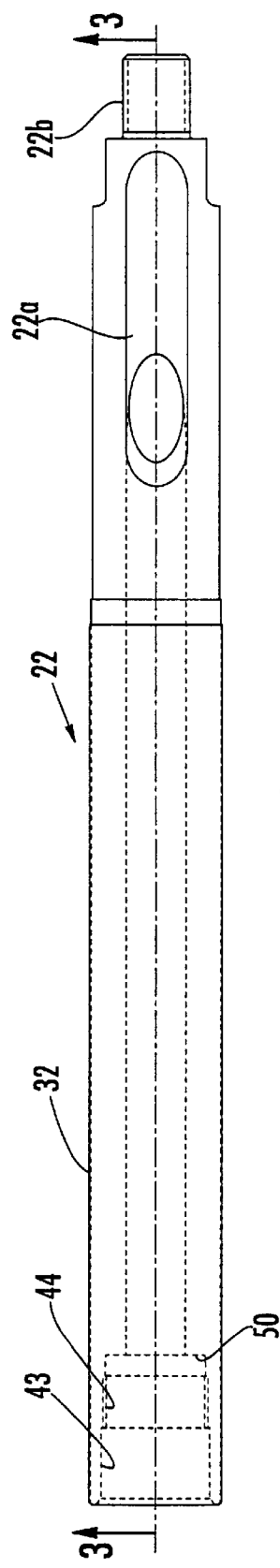
FIG. 2 is a plan view of the first tube portion of the orifice tube.
Figure 3:
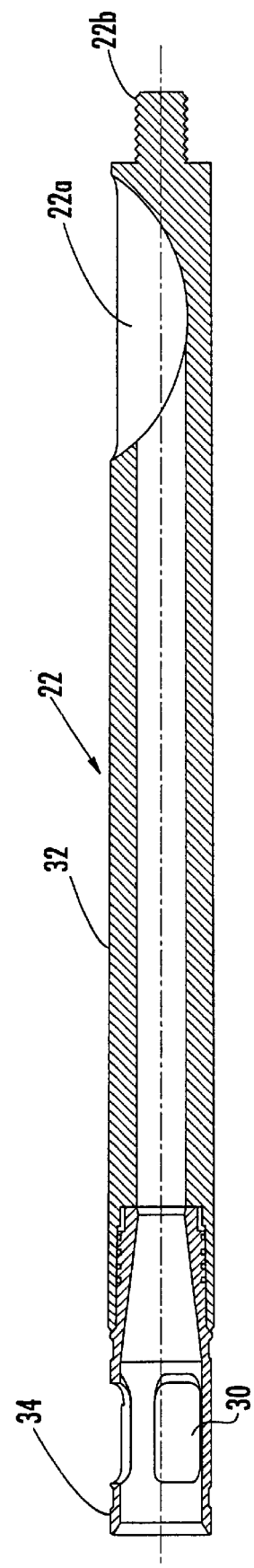
FIG. 3 is a sectional view of the entire orifice tube of the present invention and showing the first tube portion and the opposing second tube portion threaded into the first tube portion.
Figure 4:
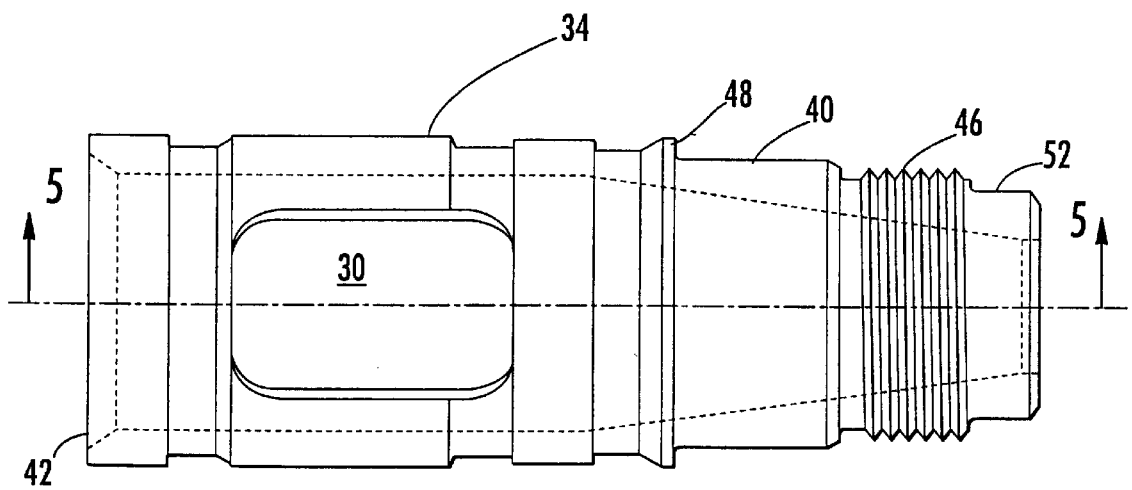
FIG. 4 is an enlarged plan view of the second tube portion that engages the fruit or vegetable and showing the open window areas.
Figure 5:
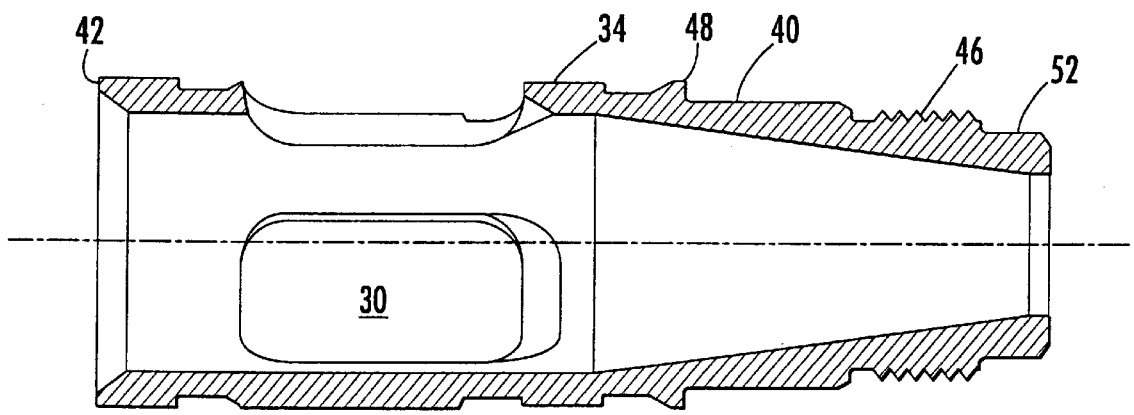
FIG. 5 is a sectional view taken along line 5—5 of FIG. 4.

To enhance juice recovery from pulp, the orifice tube 22 at the end that engages the fruit or vegetable has open "window" areas 30 as shown in FIGS. 3–5. These "windows" are formed as large openings as illustrated, and spaced preferably 120° apart, or by some other dimension and angle as determined by those skilled in the art. Because the window areas 30 typically weaken that end of the orifice tube that engages the fruit or vegetable under the imparted high pressure of machine operation, the present invention advantageously provides a two-piece orifice tube having a first tube portion 32, corresponding to the illustrated lower tube of FIG. 1, and an opposing second tube portion 34 that is threaded within the first tube portion. The second tube corresponds to the end that engages a fruit or vegetable, as illustrated. This second tube portion is formed as a short, tubular, stub-like member, which is received within the first tube portion, and dimensioned longer as shown in the respective drawings of FIGS. 2 and 3. This first tube portion 32 corresponds to the lower section of the orifice tube shown in FIG. 1, and as shown in FIGS. 2 and 3, includes a drive fitting 22b that engages the drive mechanism 29. This longer section also includes the discharge opening 22a. As a result, this portion 32 is more expensive than the second tube portion that is designed to be readily replaced when damaged.

In a preferred embodiment, the shorter, stub-like, second tube portion 34 is formed from a hardened tool steel, such as a 17-4 pH hardened material for improved material strength. The first tube portion 32, corresponding to the lower section of the orifice tube illustrated in FIG. 1, is preferably formed from a stainless steel with a surface coating to increase the wear capabilities of the part. Thus, the opposing second tube portion 34 can be readily replaced when it is damaged during operation, and the relatively expensive and longer first portion 32 that is connected to the drive mechanism does not have to be replaced.

The two-piece orifice tube design uses a threaded engagement between the first and second tube portions 32,34. A close tolerance shank 40 is formed on the second tube portion and, with the threaded engagement, provides a strong interface and close tolerance mating surface, providing concentricity without relying on thread concentricity. Thus, a strong interface and fit is maintained.

As better shown in FIGS. 4 and 5, the second tube portion is formed as a small, stub-like fitting that is received into the opposing end of the first tube portion. The second tube portion includes a fruit or vegetable engaging end 42 having the open window areas 30 formed therein. The close tolerance shank 40 is formed to be received within a first diameter section 43 of the first tube portion for guiding the second tube portion therein. Internal threads 44 are positioned in the tube 32 adjacent the first diameter section 43 and engage external threads 46 positioned on the second tube portion 34. The threads 44,46 retain the second tube portion within the first tube portion. A formed flange 48 acts as a stop against the end of the first tube portion in which the second tube portion is received. The flange 48 includes a 30° flared-out edge, but can be any angle or flaring as suggested by those skilled in the art.

Figure 6:
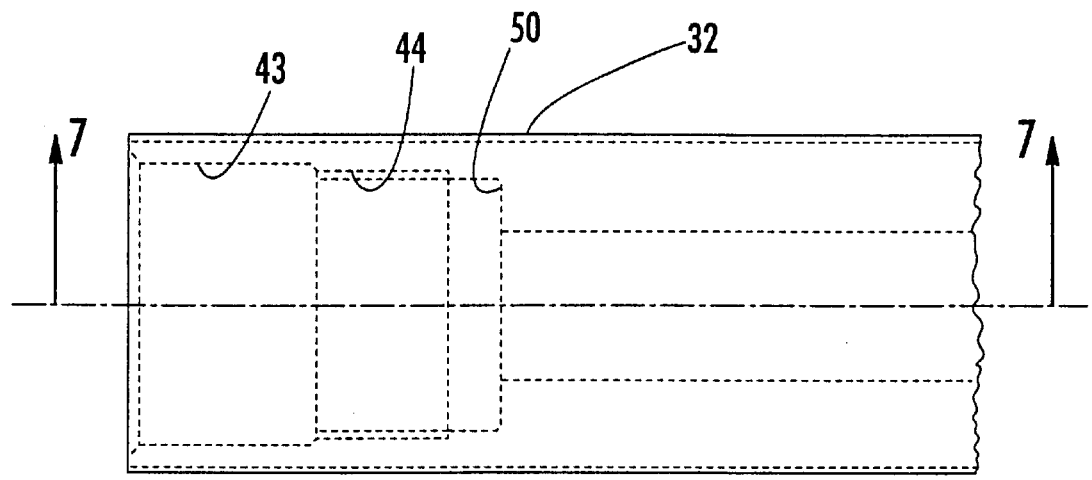
FIG. 6 is a partial plan view of the first tube portion and showing in detail the end that receives the second tube portion in threaded engagement.
Figure 7:
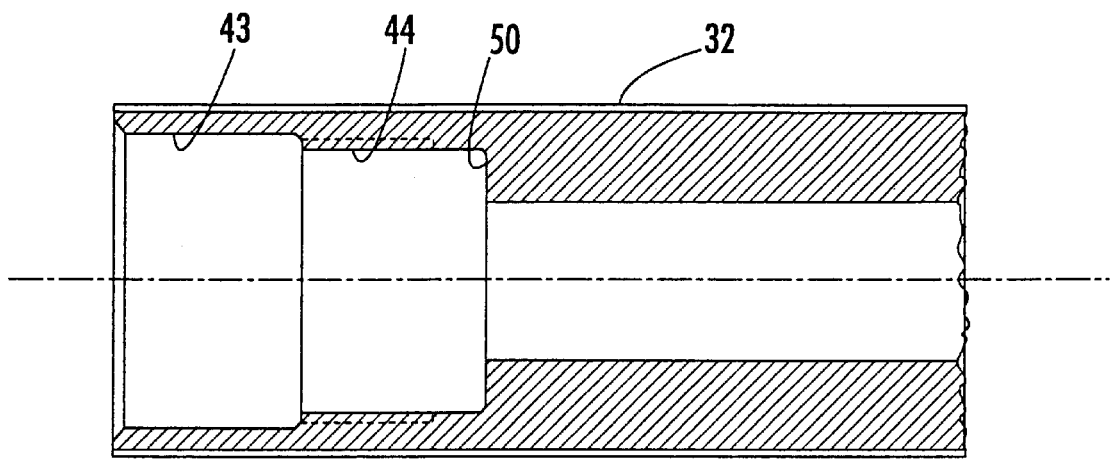
FIG. 7 is a sectional view taken along line 6—6 of FIG. 6.

As shown in FIGS. 2, 6 and 7, the first tube portion 32 includes an internal stop 50, while the opposing second tube portion 34 includes an external stop 52 formed at its end thereof, for engaging the internal stop 50 of the first tube portion. The external threads 46 and close tolerance shank 40 are dimensioned in length such that the close tolerance shank engages the first diameter section 43 as the threads first engage each other. Thus, during the initial threading of the second tube portion into the first tube portion, concentricity remains via the close fit between the close tolerance shank 40 and the first diameter section 43. The flange 48 and stops 50,52 act to prevent damage to the threads of first or second tube portions. If the second tube portion is damaged, it can be unscrewed and replaced, such that the more expensive first tube portion does not have to be replaced.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A juice extractor comprising:
    a strainer tube mounted to receive juice and pulp of fruit;
    an orifice tube movable within the strainer tube, said orifice tube including a first tube portion and opposing second tube portion threaded within the first tube portion, wherein said second tube portion has open window areas for enhancing juice recovery from pulp; and
    a drive mechanism engaging said orifice tube for reciprocating the orifice tube within the strainer tube and separating juice and pulp within the strainer tube.

2. A juice extractor according to claim 1, wherein said second tube portion includes a close tolerance shank that is received within the first tube portion for guiding the second tube portion therein.

3. A juice extractor according to claim 1, wherein said second tube portion is formed primarily from hardened tool steel and said first tube portion is formed primarily from stainless steel.

4. A juice extractor according to claim 1, wherein said first tube portion includes an internal stop and said second tube portion includes an external stop formed at an end thereof for engaging the internal stop of the first tube portion.

5. A juice extractor according to claim 4, wherein said external stop is formed as a shank.

6. A juice extractor comprising:
    a strainer tube mounted to receive juice and pulp of fruit;
    an orifice tube movable within the strainer tube, said orifice tube including a first tube portion and an opposing second tube portion having open window areas for enhancing juice recovery from pulp, said second tube portion further comprising:
        a close tolerance shank that is received within the first tube portion for guiding the second tube portion therein, and
        a threaded portion for retaining said second tube portion within the first tube portion; and
    a drive mechanism engaging said orifice tube for reciprocating the orifice tube within the strainer tube and separating juice and pulp within the strainer tube.

7. A juice extractor according to claim 6, wherein said second tube portion further comprises a flange that acts as a stop against an end of the first tube portion into which the second tube portion is received.

8. A juice extractor according to claim 7, wherein said flange is positioned adjacent said close tolerance shank.

9. A juice extractor according to claim 7, wherein said flange comprises a flared out edge.

10. A juice extractor according to claim 6, wherein said first tube portion includes an internal stop and said opposing, second tube portion includes an external stop formed at the end thereof for engaging the internal stop of the first tube portion.

11. A juice extractor according to claim 10, wherein said external stop is formed as a shank.

12. A juice extractor according to claim 6, wherein said threaded portion is formed closer to an end that engages said first tube portion than the close tolerance shank.

13. A juice extractor according to claim 6, wherein said threaded portion and close tolerance shank are dimensioned in length such that said close tolerance shank engages said first tube portion as said threaded portion also engages said first tube portion.

14. A juice extractor according to claim 6, wherein said second tube portion is formed primarily from hardened tool steel and said first tube portion is formed primarily from stainless steel.

15. An orifice tube that is received and movable for reciprocating movement within a strainer tube of a juice extractor for separating juice and pulp within the strainer tube, said orifice tube including:
    a first tube portion and opposing second tube portion threaded within the first tube portion, wherein said second tube portion has open window areas for enhancing juice recovery from pulp.

16. A orifice tube according to claim 15, wherein said second tube portion includes a close tolerance shank that is received within the first tube portion for guiding the second tube portion therein.

17. A orifice tube according to claim 15, wherein said second tube portion is formed primarily from hardened tool steel and said first tube portion is formed primarily from stainless steel.

18. An orifice tube that is received and movable for reciprocating movement within a strainer tube of a juice extractor for separating juice and pulp within the strainer tube and comprising:
    a first tube portion and an opposing second tube portion having open window areas for enhancing juice recovery from pulp, said second tube portion further comprising:
        a close tolerance shank that is received within the first tube portion for guiding the second tube portion therein, and
        a threaded portion for retaining said second tube portion within the first tube portion.

19. A orifice tube according to claim 18, wherein said second tube portion further comprises a flange that acts as a stop against an end of the first tube portion into which the second tube portion is received.

20. A orifice tube according to claim 19, wherein said flange is positioned adjacent said close tolerance shank.

21. A orifice tube according to claim 19, wherein said flange comprises a flared out edge.

22. A orifice tube according to claim 19, wherein said first tube portion includes an internal stop and said second tube portion includes an external stop formed at the end thereof for engaging the internal stop of the first tube portion.

23. A orifice tube according to claim 22, wherein said external stop is formed as a shank.

24. A orifice tube according to claim 18, wherein said threaded portion is formed closer to an end that engages said first tube portion than the close tolerance shank.

25. A orifice tube according to claim 18, wherein said threaded portion and close tolerance shank are dimensioned in length such that said close tolerance shank engages said first tube portion as said threaded portion engages said first tube portion.

26. A orifice tube according to claim 18, wherein said second tube portion is formed primarily from hardened tool steel and said first tube portion is formed primarily from stainless steel.

* * * * *